US012148208B2

(12) United States Patent
Moton, Jr. et al.

(10) Patent No.: US 12,148,208 B2
(45) Date of Patent: Nov. 19, 2024

(54) VIDEO ANNOTATION FOR PREPARATION OF CONSUMABLE ITEMS

(71) Applicant: AT&T Intellectual Property I, L.P., Atlanta, GA (US)

(72) Inventors: Robert T. Moton, Jr., Alpharetta, GA (US); Adrianne Binh Luu, Atlanta, GA (US); James Pratt, Round Rock, TX (US); Barrett Kreiner, Woodstock, GA (US); Walter Cooper Chastain, Atlanta, GA (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 506 days.

(21) Appl. No.: 17/330,810

(22) Filed: May 26, 2021

(65) Prior Publication Data

US 2022/0383026 A1 Dec. 1, 2022

(51) Int. Cl.
*G06V 20/20* (2022.01)
*G06F 3/0481* (2022.01)
*G06F 40/169* (2020.01)
*G06K 7/10* (2006.01)
*G06K 19/06* (2006.01)
*G06K 19/07* (2006.01)
*G06T 11/00* (2006.01)
*G06V 20/40* (2022.01)
*G06V 40/10* (2022.01)

(52) U.S. Cl.
CPC ............ *G06V 20/20* (2022.01); *G06F 3/0481* (2013.01); *G06F 40/169* (2020.01); *G06K 7/10366* (2013.01); *G06K 7/10722* (2013.01); *G06K 19/06028* (2013.01); *G06K 19/06037* (2013.01); *G06K 19/0723* (2013.01); *G06T 11/00* (2013.01); *G06V 20/41* (2022.01); *G06V 40/10* (2022.01)

(58) Field of Classification Search
CPC .............................. G06F 3/0481; G06T 11/00
See application file for complete search history.

(56) References Cited

U.S. PATENT DOCUMENTS

| 2007/0250901 A1* | 10/2007 | McIntire | ................ G11B 27/34 348/E7.071 |
| 2009/0014514 A1* | 1/2009 | Hatori | .................... G06Q 10/10 235/376 |
| 2012/0099756 A1* | 4/2012 | Sherman | .............. G07G 1/0063 382/100 |
| 2014/0156459 A1* | 6/2014 | Zises | .................. G06Q 30/0643 705/26.61 |
| 2015/0134403 A1* | 5/2015 | Schwartz | ........... G06Q 30/0623 705/7.29 |

(Continued)

*Primary Examiner* — Edward Park

(57) ABSTRACT

A processing system including at least one processor may capture a video of a preparation area for a consumable item, may identify at least one item in the video, the at least one item comprising at least one of: at least one ingredient of the consumable item, or at least one tool for preparing the consumable item, and may identify annotation content for the at least one item. The processing system may then modify the video to generate a modified video that includes a visual marker associated with the annotation content and present the modified video via a device associated with a user to be served the consumable item.

20 Claims, 5 Drawing Sheets

(56) References Cited

U.S. PATENT DOCUMENTS

| | | | |
|---|---|---|---|
| 2015/0229996 A1* | 8/2015 | Jo | H04N 21/84 |
| | | | 725/37 |
| 2020/0242685 A1* | 7/2020 | Dollens | G06F 3/04817 |
| 2021/0030199 A1* | 2/2021 | Olson | G06Q 20/202 |
| 2021/0251263 A1* | 8/2021 | Knighton | A23L 5/10 |
| 2022/0027599 A1* | 1/2022 | Pinel | G06Q 30/0643 |

* cited by examiner

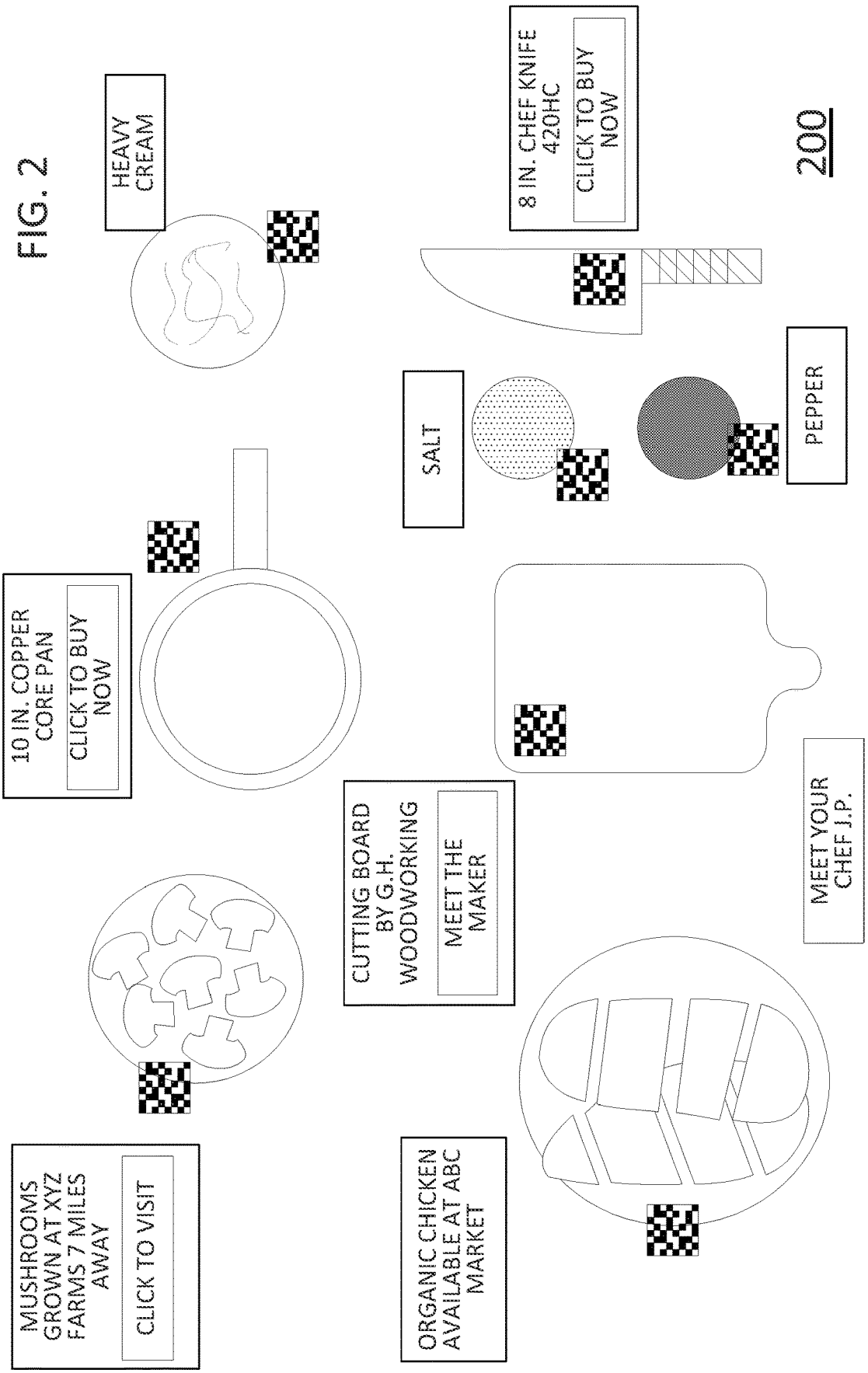

FIG. 3

ANNOTATION DATA DATABASE 310

ANNOTATION DATA RECORDS 312 (INGREDIENTS)

| | CHICKEN | MUSHROOMS | SALT | PEPPER | CREAM | ... |
|---|---|---|---|---|---|---|
| QR CODE | 1 | 2 | 3 | 4 | 5 | ... |
| SOURCE DATA | SD CHICKEN | SD MUSHROOMS | | | | ... |
| FRESHNESS DATA | | FD MUSHROOMS | | | FD CREAM | ... |
| SAFETY DATA | CHICKEN SD | | | | | ... |

ANNOTATION DATA RECORD 314

| TOOL ITEM ID | QR CODE | NAME | COMPOSITION | WHERE TO BUY | LAST CLEANED |
|---|---|---|---|---|---|
| ABC987 | 34 | 8 IN. CHEF KNIFE 420HC LMN KNIFE CO. | STEEL 420HC | WWW.WWW.COM | TODAY 7:15 PM |

ANNOTATION DATA RECORD 316

| CHEF ID BADGE | NAME | BIOG. DATA | MIC | CAMERA |
|---|---|---|---|---|
| DEF56 | J.P. | TRAINED AT TYU CULINARY INSTITUTE | 10 | 7 |

DINER RECORD 320

| DINER ID | NAME | MEAL NO. | MEAL | DEVICE ID | TABLE NO. |
|---|---|---|---|---|---|
| D123 | J.M DINER | 5632 | CHICKEN W/ MUSHROOMS | 4564 | 12 |

VIDEO ANNOTATION FOR PREPARATION OF CONSUMABLE ITEMS

The present disclosure relates generally to interactive dining systems and more particularly to methods, computer-readable media, and apparatuses for modifying a video of a preparation area of a consumable item to generate a modified video that includes a visual marker associated with annotation content for at least one item in the video for presentation via a device associated with a user to be served the consumable item.

BACKGROUND

Current restaurant technologies may include inventory management systems, ordering systems, and point-of-sale devices. For instance, some restaurants may track which dishes are most ordered, and may adjust menus in response to the most popular dishes. In addition, some restaurants may keep track of repeat patrons and the dished they order (e.g., in a customer database), so as to allow wait-staff to recommend and remind patrons of the dishes they have previously enjoyed. Moreover, table-side or table-top electronic devices have been introduced in some restaurants via which diners can view menus, place orders, and pay for services.

SUMMARY

In one example, the present disclosure describes a method, non-transitory computer-readable medium, and apparatus for modifying a video of a preparation area of a consumable item to generate a modified video that includes a visual marker associated with annotation content for at least one item in the video for presentation via a device associated with a user to be served the consumable item. For instance, in one example, a processing system including at least one processor may capture video of a preparation area for a consumable item, may identify at least one item in the video, the at least one item comprising at least one of: at least one ingredient of the consumable item or at least one tool for preparing the consumable item, and may identify annotation content for the at least one item. The processing system may then modify the video to generate a modified video that includes a visual marker associated with the annotation content and present the modified video via a device associated with a user to be served the consumable item.

BRIEF DESCRIPTION OF THE DRAWINGS

The teachings of the present disclosure can be readily understood by considering the following detailed description in conjunction with the accompanying drawings, in which:

FIG. 2 illustrates an example modified video of a preparation of a consumable item, in accordance with the present disclosure;

FIG. 3 illustrates an example annotation data database and an example diner record, in accordance with the present disclosure;

To facilitate understanding, identical reference numerals have been used, where possible, to designate identical elements that are common to the figures.

DETAILED DESCRIPTION

Figure 1:
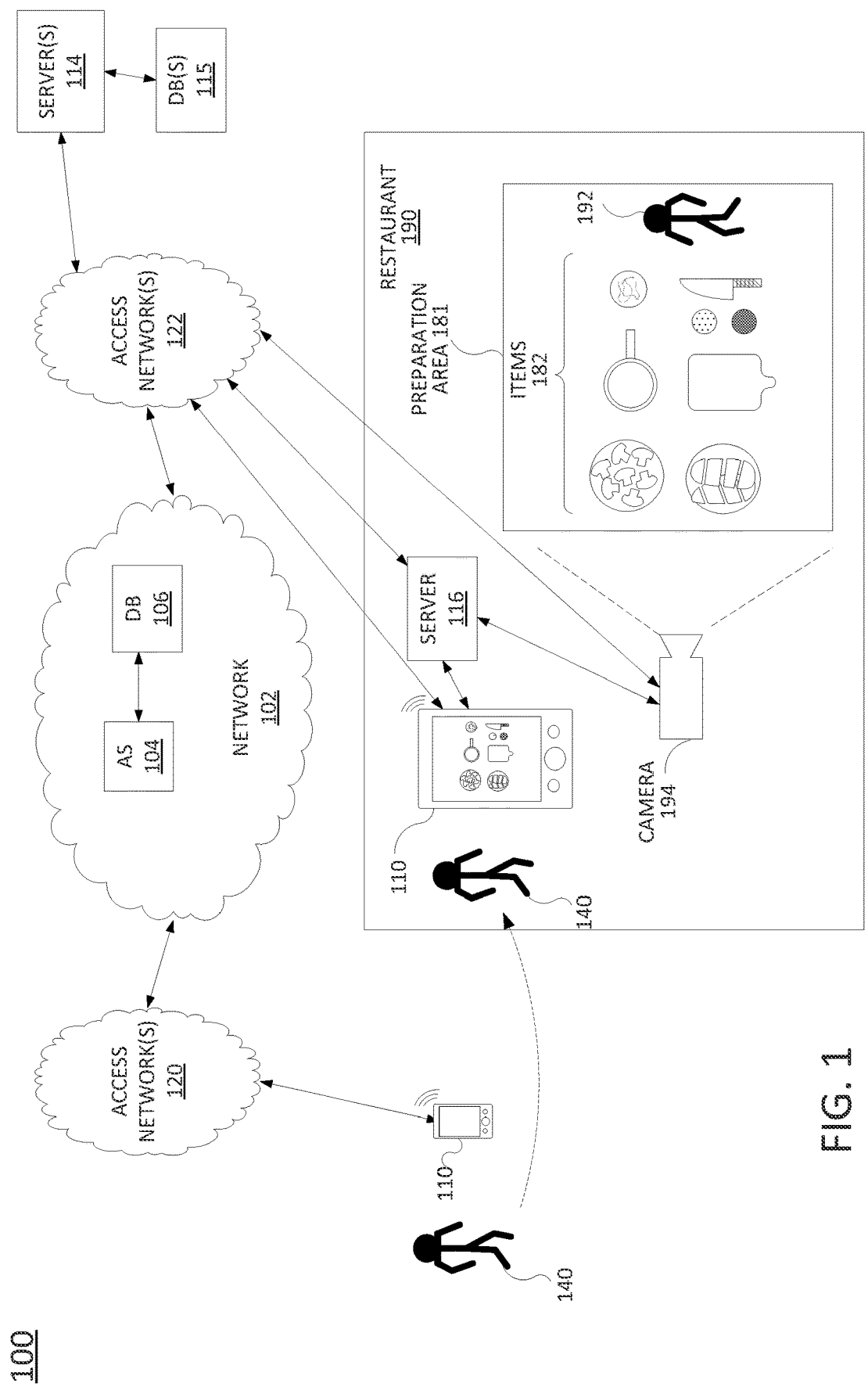
FIG. 1 illustrates an example system comprising one or more communication networks related to the present disclosure.

Examples of the present disclosure provide video-based access to information about a consumable item (e.g., a food or drink item) that is being prepared for a user concurrent with the preparation. For instance, a diner may be in a restaurant where the preparation occurs or may be in a remote location. The information may be presented as annotations to a video of the preparation of the consumable item, or may be accessible via annotations comprising links to the annotation content in the form of video, audio, and/or text, and may contain real-time and non-real-time content (broadly "annotation content").

To illustrate, a kitchen may be equipped with an overhead camera that is positioned over an area where the meal is prepared, and may capture video of the preparation of the consumable item. The video may then be annotated with annotation content or links to such annotation content. The annotation content may be related to sourcing of ingredients for the meal, preparation techniques, tools used, information about a chef, and other topics. For instance, the kitchen may be equipped with ingredients, each of which may have a unique visual identifier, such as a bar code, quick response (QR) code, or other identifying marks that may be detected in an image or video. Visual identifiers may also be associated with tools or other implements that may come into the picture during the course of preparation of a meal. The camera may be networked to a server which may be on site or accessible via one or more networks. The server may interpret the visual identifiers for various purposes. For instance, the server may have access to data in an annotation data database, and may annotate the video accordingly.

One or more diners may be equipped with an electronic device that may be used for ordering and viewing meal preparation. Within the kitchen, there may be one or more sensors that may also be networked to the server. These sensors may be used to identify operating conditions in the kitchen. This may include environmental conditions, such as temperature or humidity of the meal preparation area, or settings related to kitchen cooking equipment such as oven temperatures, stove flame settings, or other settings. In one example, personnel in the kitchen may also be outfitted with sensors that may track their presence (e.g., RF IDs), and which in one example may also record biometric data, such as body temperature, heart rate, etc. The kitchen, or at least the food preparation area thereof, may also be equipped with a microphone which the chef may access and use to communicate with the diner(s) for whom the chef is preparing a consumable item, or other diners at a same table. Alternatively, or in addition, the chef may be equipped with a wearable microphone that may similarly be used to communicate with the diner(s).

A diner may be equipped with an electronic device such as a smartphone, smartwatch, or other mobile devices. In addition, the device may include an application (app) for restaurant dining. The app may be for a specific restaurant or may be functional across a number of different restaurants.

In one example, the diner may use the app on the device to make a menu selection. In addition, in one example, the menu selection may be sent to a diner database which may also be accessed by the kitchen in order to know what to prepare. The database may maintain a diner identifier (ID) and an identifier for the diner's device (device ID, e.g., Media Access Control (MAC) address and the like). In one example, the diner database may comprise an entry that includes the device ID and a menu item selection. For example the diner may select "chicken with mushroom sauce," and that menu selection along with the diner's device ID may be sent to the diner database and recorded therein.

In one example, the diner database may be part of or accessible to a server that obtains and annotates the video of the preparation of the consumable item. The server may also retrieve a list of ingredients for the dish from the annotation data database, along with annotation data associated with one or more of the ingredients. The annotation data may include source data, such as the name and location of a farm or manufacturing plant, an image or video associated with the source, a link to retrieve additional information, a link to interact with the farmer, and so forth. The annotation data may also comprise freshness data, such as the date the ingredient was harvested or packaged, a "best by" date, or other data. In one example, the annotation data may alternatively or additionally comprise certification data, e.g., safety data, such as Food and Drug Administration (FDA) approval for the ingredient or the source that provides it, or other such annotation data of a similar nature, e.g., organic data as to whether the ingredients are organic and their associated organic certifications and so on.

The server may also have access, in the annotation data database or elsewhere, to annotation data about the restaurant, the food preparer/chef, and other relevant data about the establishment. For instance, when the order for the consumable item is stored in the diner database, it may be retrieved by a chef via a tablet or other computing devices in the food preparation area. The chef may use the device to associate a name or chef ID with the consumable item as the preparer. The chef ID may also be associated in the annotation data database with one or more sensors or other network-connected devices in the food preparation area for providing operational data in connection with the preparation of the consumable item.

The annotation data database may also include data related to tools used in the preparation of the consumable item. For instance, pots, pans, utensils, cutting boards, bowls, plates, blenders, mixers, and so forth may contain visual indicators, e.g., QR codes, or the like, which may be used to access data about the tool, such as its composition, where it came from, when it was last in a dishwasher, and so forth. With the diner's device ID, dish, and ingredients known, the chef and video camera identified, and annotation data accessible, a video of the preparation of the dish may be streamed from the camera to the diner's device in accordance with the device ID. The QR codes (or other visual codes or makers) within the video stream may be identified by the server in order to determine what is on screen. Alternate video analysis techniques may be used as well, such as identifying items/objects on-screen in accordance with object detection and recognition models. These items, such as ingredients and tools used in the preparation of the consumable item may be identified by the server by adding annotation data to the video stream. The annotation data (or "annotation content") may be overlaid near the respective items that are identified, or may be placed elsewhere within the video, such as an information box or ticker along the bottom or top of each frame, and so forth. In addition, purchasing information may be stored in the annotation data database and may also be presented as annotation data. In one example, the server may add a visual marker to the video stream that may represent a link to annotation data. For instance, the diner may interact with the display via a speech recognition interface, touch screen, or the like, to initiate a purchase, watch a video, listen to audio, or request other such data. Similarly, a visual marker may be added to indicate the ability to converse with the chef. For example, if the chef is equipped with a headset having a microphone, the diner may interact with the chef by selecting a visual marker from the visual feed, commanding the diner's device to initiate the communication via a voice command, etc. In one example, use of the voice interaction feature may require a special fee to the diner. The diner may ask questions, or in one example, may simply listen in to the activity in the kitchen (e.g., when the chef is not available for instantaneous interaction with the diner). Other operational data from the preparation area may also be presented directly as annotations to the video, or via visual markers/links in the video that, when selected, may provide access to information regarding air quality, oven temperature, etc.

In one example, the diner may request, at some time before or during the experience, that the video, with annotations, be recorded (e.g., a special occasion dining experience, a learning experience, and the like). Likewise, the experience may be recorded by the restaurant (e.g., a special meal preparation for a diner (e.g., a birthday meal, an anniversary meal and so on)). In either case, the modified video may be saved and time-stamped, and the content of each annotation may be saved and timestamped according to when it was present in the video (or when the visual marker associated therewith was present). As such, the timestamped annotations allow for subsequent searching. For instance, if the modified video of the experience is saved and the diner wants to recall the name of the farm from which the mushrooms were sourced, the user may open the video and use a search tool to search for the annotation content for "mushrooms." The result returned from the annotation content search may show that the annotation content containing "mushrooms" first occurs at time 2:45:03. The search result may find the frame from the video content at that time and display it as the final search result. The modified video and annotation data may also be saved and analyzed to document how a dish was prepared by a specific chef to help determine best practices, which farms provide ingredients that produce the most satisfaction on diner surveys, and other purposes. These and other aspects of the present disclosure are described in greater detail below in connection with the examples of FIGS. 1-5.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102 (e.g., a telecommunication network of a telecommunication service provider). The network 102 may be in communication with one or more access networks 120 and 122, and the Internet (not shown). In one example, network 102 may combine core network components of a cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video-on-demand (VoD) server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an Institute of Electrical and Electronics Engineers (IEEE) 802.11/Wi-Fi network and the like), cellular access networks, $3^{rd}$ party networks, and the like. For example, the operator of network 102 may provide a broadband Internet access service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental, or educational institution LANs, and the like. In one example, one or more of access network(s) 122 may be associated with a restaurant 190.

In one example, the access networks 120 may be in communication with one or more devices, such as device 110. Similarly, access networks 122 may be in communication with one or more devices, e.g., servers 114 and 116, camera 194, etc. Access networks 120 and 122 may transmit and receive communications between devices 110, servers 114 and 116, camera 194, application server (AS) 104 and/or other components of network 102, devices reachable via the Internet in general, and so forth. In one example, device 110 may comprise any single device or combination of devices that may comprise an endpoint device, e.g., a client device. For example, the devices 110 may comprise a mobile device, a cellular smart phone, a laptop, a tablet computer, a desktop computer, a wearable computing device, an application server, a bank or cluster of such devices, an IoT device, and the like.

In one example, device 110 may be associated with a user 140, e.g., a diner/patron eating at a restaurant 190 (or in one example, picking up or having one or more consumable items delivered from restaurant 190). In one example, device 110 may have an application (app) installed thereon, which may facilitate booking/reserving tables at one or more restaurants, including restaurant 190. In one example, any one or more of devices 110 may include one or more radio frequency (RF) transceivers (as well as antenna(s), and/or other components) for cellular communications and/or for non-cellular wireless communications, such as for IEEE 802.11 based communications, IEEE 802.15 based communications, and so forth.

Figure 4:
FIG. 4 illustrates a flowchart of an example method for modifying a video of a preparation area of a consumable item to generate a modified video that includes a visual marker associated with annotation content for at least one item in the video for presentation via a device associated with a user to be served the consumable item.
Figure 5:
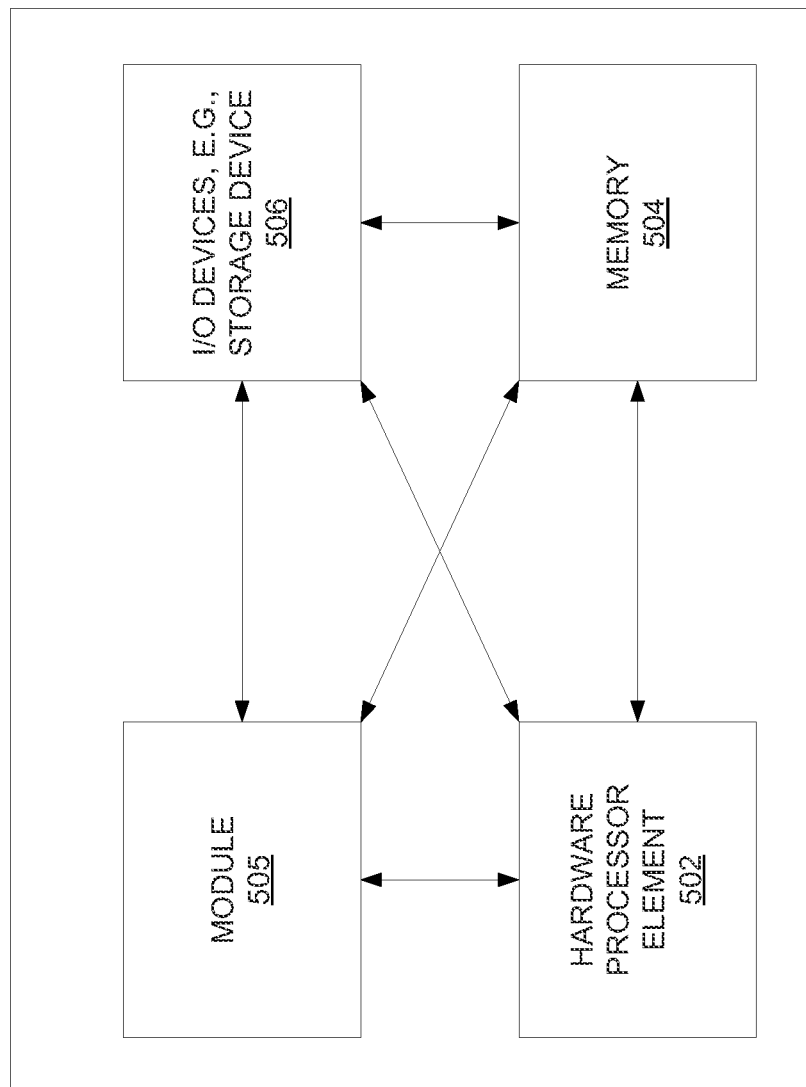
FIG. 5 illustrates a high level block diagram of a computing device specifically programmed to perform the steps, functions, blocks and/or operations described herein.

In one example, device 110 may comprise a computing device or processing system, such as computing system 500 depicted in FIG. 5, and may be configured to provide one or more operations or functions in connection with examples of the present disclosure for modifying a video of a preparation area of a consumable item to generate a modified video that includes a visual marker associated with annotation content for at least one item in the video for presentation via a device associated with a user to be served the consumable item. A flowchart of an example method 400 for modifying a video of a preparation area of a consumable item to generate a modified video that includes a visual marker associated with annotation content for at least one item in the video for presentation via a device associated with a user to be served the consumable item is illustrated in FIG. 4 and discussed in greater detail below.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 5 and discussed below) or multiple computing devices collectively configured to perform various steps, functions, and/or operations in accordance with the present disclosure.

Similarly, server(s) 114 may each comprise a computing system or server, such as computing system 500 depicted in FIG. 5, and may be configured to perform operations in connection with examples of the present disclosure for modifying a video of a preparation area of a consumable item to generate a modified video that includes a visual marker associated with annotation content for at least one item in the video for presentation via a device associated with a user to be served the consumable item, e.g., as described in connection with FIG. 4. For instance, server(s) 114 may provide a consumable item video annotation system in accordance with the present disclosure. In one example, database(s) 115 may represent one or more distributed file systems, e.g., a Hadoop® Distributed File System (HDFS™), or the like. Server(s) 114 may receive and store information in database(s) 115 as annotation data records comprising information regarding source data, freshness data, safety data, or other information regarding ingredients used in the preparation of consumable items at restaurant 190, and information regarding tools that may be used in the preparation of consumable items in restaurant 190, such as the name of the tool, the composition of the tool, information in where to buy (which may include web addresses/links for purchasing), information on when the tool was last cleaned, and so forth. In one example, server(s) 114 may also receive and store diner profiles/diner records of different diners, such as user 140, in a diner database, may update the diner profiles, and so forth. Examples of annotation data records and diner records are illustrated in FIG. 3 and described in greater detail below.

In one example, AS 104 may comprise a network-based server (or servers) providing a consumable item video annotation system. In this regard, AS 104 may comprise the same or similar components as server(s) 114 and may provide the same or similar functions, or at least a portion thereof. For instance, an operator of network 102 may provide a consumable item video annotation service via AS 104 in accordance with the present disclosure (e.g., in addition to telecommunication services such as TV, phone, internet access, etc., as described above). For example, AS 104 may store in DB(s) 106 annotation data records for ingredients and tools of restaurant 190 in an annotation data database, and diner profiles in a diner database. For instance, DB(s) 106 may be the same as or similar to DB(s) 115. Thus, although the following examples are described primarily in connection with server(s) 114, it should be understood that the descriptions may equally apply to AS 104.

As illustrated in FIG. 1, server 116 may comprise a restaurant management system (e.g., a processing system) of restaurant 190. Server 116 may store an inventory of ingredients, available menu items, their costs of ingredients and/or cost to produce, the menu prices, the profit per menu item, etc., reservations for current and upcoming meals, the staff scheduled to work for each meal, and so forth. In one example, server 116 may store annotation data records for ingredients and tools that may be used in the preparation of consumable items (e.g., menu items) at restaurant 190. In one example, server 116 may also store annotation content (which in some cases, may be separate from the annotation data record(s)). In addition, in one example, server 116 may obtain and store diner profiles/diner records of diners at current or upcoming meals, such as user 140. In one example, server 116 may comprise a computing system or server, such as computing system 500 depicted in FIG. 5, and may be configured to perform operations in connection with examples of the present disclosure for modifying a video of a preparation area of a consumable item to generate a modified video that includes a visual marker associated with annotation content for at least one item in the video for presentation via a device associated with a user to be served the consumable item, e.g., as described in connection with FIG. 4.

In an illustrative example, user 140 may book a dinner reservation with restaurant 190. For instance, user 140 may make a reservation via device 110, such as using an app or navigating to a webpage to connect to a booking and reservation system (e.g., in one example server 116). In one example, a diner profile of user 140 may be provided to the restaurant 190. For instance, user 140 may grant permission for server(s) 114 to provide the respective diner profile to server 116 in connection with the particular reservation, or may provide a more general authorization to enable server(s) 114 to provide the diner profile to restaurants for which reservations have been made. In another example, the diner profile may be provided to server 116 when the device of user 140 is present at the restaurant 190 (e.g., device 110). For instance, the presence of user 140 may be detected at restaurant 190 via the device's Global Positioning System (GPS) location data, which may be provided by device 110 to server(s) 114, which may then provide the diner profile to server 116. Alternatively, or in addition, server 116 may detect the presence of device 110 via peer-to-peer and/or short range wireless communications, e.g., IEEE 802.11 based communications (e.g., Wi-Fi, Wi-Fi Direct), IEEE 802.15 based communications (e.g., Bluetooth, Bluetooth Low Energy (BLE), and/or ZigBee communications), LTE Direct, or the like. Accordingly, server 116 may then request the diner profile of user 140 from server(s) 114. For instance, server 116 may obtain the diner identifier (diner IDs) or device identifier (device ID) from user 140 and/or from device 110. However, in another example, device 110 may alternatively or additionally maintain a diner profile, and may provide such diner profile to server 116 upon request (e.g., with authorization of the user 140).

In one example, server 116 may provide an electronic menu to user 140 at device 110. For instance, server 116 may establish a communication session, or sessions with device 110 via local and/or peer-to-peer wireless link(s), e.g., IEEE 802.11 based communications, IEEE 802.15 based communications, or the like, or over one or more networks, e.g., access network(s) 122, network 102, or the Internet in general, and so forth. In one example, the communication between server 116 and device 110 may be via server(s) 114 as an intermediary (e.g., as part of a consumable item video annotation service).

In one example, user 140 may make a selection of one or more menu items, e.g., via interactive components of the menu that is presented via device 110. The user's selection (s) may be conveyed to server 116, e.g., via peer-to-peer and/or short range wireless communications with server 116, via cellular connections of device 110 and communication session(s) with server 116 over one or more networks, and/or via server(s) 114 as an intermediary service, etc. In another example, restaurant 190 may utilize paper or other physical menus. In such case, user 140 may order menu items (e.g., "consumable items"), such as by conversing with restaurant wait-staff, and the order may be entered into an ordering and fulfillment system. For instance, one aspect of server 116 may include an ordering and fulfillment system, which may receive orders via one or more computing devices deployed in restaurant 190 and/or carried by wait-staff (e.g., kiosks, tablet computing devices, etc.), or via diners' devices (such as device 110). In addition, such an ordering and fulfillment system of server 116 may display pending orders on a screen in food preparation area 181 (e.g., a kitchen) of restaurant 190, may obtain inputs from restaurant staff indicating that orders are complete and/or have been delivered to diners, and so forth.

Within the preparation area 181, a food preparer, e.g., chef 192, may be assigned or may otherwise undertake to fulfill the order of user 140. For instance, chef 192 may see an order for user 140 in a queue of pending orders waiting to be prepared that is presented on a display screen in preparation area 181. In one example, server 116 may store electronic recipes and/or at least a list of ingredients for each menu item, and may cause a list of ingredients to be displayed along with the order and the identification of the menu item(s) that is/are part of the order. As illustrated in FIG. 1 the restaurant 190 may include a camera 194 that is directed at preparation area 181. For instance, camera 194 may be overhead and directed downward at a food preparation surface, or surfaces, in preparation area 181. However, in another example, different deployments and/or orientations of camera 194 may be utilized, such as an angular view of the preparation area 181, a side or front view, etc.

In one example, the chef 192 may provide an input, such as via tapping the order on a touchscreen, via voice command/input, and so forth, indicating that chef 192 is beginning the preparation of the order for user 140. The input may be received by server 116, which may then begin streaming a video, e.g., a video feed, from camera 194 to user 140 at device 110. For instance, chef 192 may indicate that camera 194 and/or preparation area 181 (if there is more than one designated preparation area in restaurant 190) will be utilized. Alternatively, or in addition, chef 192 may wear a trackable badge, such as a radio frequency identification (RFID) tag that may indicate where chef 192 is working. In any case, once camera 194 is identified for the preparation of the order of user 140, server 116 may establish the video streaming. In one example, the video streaming may be part of a current/ongoing communication session between server 116 and device 110. Alternatively, a separate session for video streaming may be established. In either case, the video stream may be conveyed via peer-to-peer and/or short range wireless communication between server 116 and device 110, via a cellular connection of device 110 and communication session(s) with server 116 over one or more networks, and/or via server(s) 114 as an intermediary service, etc.

Continuing with the present example, chef 192 may assemble ingredients and tools to be used in the preparation of a menu item (e.g., a "consumable item" or "dish") for user 140. For instance, user 140 may have ordered "chicken and mushrooms." Thus, chef 192 may assemble various ingredients such as: sliced chicken, mushrooms, heavy cream, salt, and pepper. In addition, chef 192 may assemble various tools, such as a cutting board, a knife, and a pan (collectively items 182 in FIG. 1).

Referring now to FIG. 2, illustrated is an example portion of a video 200 (e.g., an annotated video) of a preparation of a consumable item. For instance, video 200 may represent a portion of the video captured via camera 194 of FIG. 1 that is streamed to device 110. Visible in the video 200 of FIG. 2 are several ingredients that may be assembled by chef 192 and brought into the preparation area 181, e.g., chicken, mushrooms, heavy cream, salt, and pepper. Also visible in the video 200 are several tools, e.g., a cutting board, knife, and pan. As noted above, each of these items may be labeled with a QR code, either affixed to the item itself, or to a container of the item or the like (e.g., on the outside of a bowl, a bag, a box, etc.). In another example, other visual codes that are detectable in images/video may be utilized to uniquely identify each ingredient or tool. As such, the video 200 may initially be obtained by server 116 from camera 194. Server 116 may then detect the QR codes or other visual codes present in the video 200. Next, server 116 may look-up any QR codes (or other visual code(s)) that are detected, e.g., in an annotation data database.

Referring now to FIG. 3, an example annotation database 310 is illustrated. For instance, annotation database 310 may include annotation data records 312 for various ingredients. The annotation data records 312 for each ingredient may include, for example, a QR code associated with the ingredient and annotation content comprising, for instance: source data associated with the ingredient (if available/known), freshness data of the ingredient (if available/known), and safety data associated with the ingredient (if available/known). For instance, the ingredient "chicken" has an associated QR code identified as "1," and includes source data (e.g., "SD chicken") and safety data (e.g., "chicken SD"). Similarly, the ingredient of "mushrooms" includes source data (e.g., "SD mushrooms") and freshness data (e.g., "FD mushrooms"), but does not include safety data. In one example, each of these various fields may include the underlying relevant annotation content, or a link or identifier of where and/or how the relevant annotation content can be obtained. For instance, for mushroom freshness data, "FD mushrooms" may represent an actual expiration date, an actual date that the mushrooms were picked, etc. In one example, the source data for chicken may represent actual text information on where the chicken was purchased (e.g., "ABC Market"). On the other hand, the source data for mushroom may include a link to the source data, such as a uniform resource locator (URL) of a website for "XYZ Farms" where the mushrooms were sourced. It should be noted that while all of the annotation data records 312 appear to be associated with ingredients of a menu item ordered by user 140 of FIG. 1 (and as illustrated in FIG. 2, e.g., "chicken and mushrooms"), the annotation data database 310 may include various additional annotation data records for different ingredients that may be used for other menu items of restaurant 190. In addition, the annotation data records 312 (and/or other annotation data records of annotation data database 310 that are omitted from illustration in FIG. 3) may be arranged and/or stored in a different order than that which appears in FIG. 3. For instance, a record for mushrooms does not necessarily sequentially follow a record for chicken in the annotation data database 310, and so forth.

In one example, the annotation data records 312 may be created for each ingredient by personnel of the restaurant 190, and may be similarly updated by such personnel. Alternatively, or in addition, annotation data records 312 may be automatically updated and/or generated. For instance, suppliers may provide ingredients with QR codes or other identifiers affixed thereto. When obtained by restaurant 190, the personnel of restaurant 190 may scan the QR codes (or other identifiers) which may be passed to server 116, wherein server 116 may look-up and access a URL or other link identified by the QR code, and which may add a respective record to the annotation data records 312. For instance, a server associated with a supplier or other network-based servers (such as server(s) 114 and/or AS 104) may maintain source data, freshness data, safety data, etc. (such as in DB(s) 115 or DB 106), which may be accessed via URLs/links associated with QR codes affixed to various items.

As further illustrated in FIG. 3, the annotation data database 310 may include an annotation data record 314 for a tool that may be used in the preparation of consumable items at restaurant 190. The annotation data record 314 may include, for example, a tool item identifier (ID), a QR code associated with the tool and annotation content comprising, for example: a name of the tool, a composition of the tool, information on where to purchase the tool, information on when the tool as last cleaned, etc. In this case, the annotation data record 314 may relate to a knife that is visible in video 200 of FIG. 2. Thus, for example, the annotation data record 314 indicates that the knife is an 8 inch chef knife made by LMN Knife Company and is made of 420HC steel. In addition, there is a URL/link to a website where the knife may be available for purchase and information indicating that the knife was last cleaned "today 7:15 PM." It should be noted that while several annotation data records 312 are illustrated in FIG. 3, for illustrative purposes a single annotation data record 314 associated with a tool is shown. Thus, it should be understood that annotation data database 310 may include additional annotation data records of a same or similar nature with regard to other tools that may be used in the preparation of consumable items (e.g., another annotation data record for a cutting board, another annotation data record for a pan, etc.).

Annotation data database 310 may further include records for personnel of restaurant 190, such as annotation data record 316 for a chef named "J.P." For instance, annotation data record 316 may include a chef identifier (ID), a badge number (e.g., an RFID tag identifier), the name of the chef (or other staff), and biographical data, such as where the chef trained, previous locations of work, etc. In the present example, annotation data record 316 also includes a microphone identifier and a camera identifier, which may indicate a microphone and camera associated with the chef. For instance, assuming that annotation data record 316 identifies the chef 192 of FIG. 1, the camera identifier "7" may identify camera 194 of FIG. 1 that is currently associated with chef 192. Similarly, the microphone identifier "10" may identify a microphone that is currently worn by chef 192. For instance, multiple wireless microphones may be used by chefs within the restaurant 190, which may be "checked-out" by different chefs when working different meals. The camera and microphone identifiers may be IP addresses, media access control (MAC) addresses, Bluetooth names/identifiers, or the like. Thus, for example, server 116 may access the camera(s) and microphone(s) that may be connected to server 116 via a local network, peer-to-peer wireless links, etc. using the respective identifiers. It should also be understood that annotation data database 310 may include additional annotation data records of a same or similar nature with regard to other chefs, or other personnel of restaurant 190 that may engage in the preparation of consumable items (e.g., menu items).

Lastly, FIG. 3 illustrates an example diner record 320, which may include a diner identifier (ID) and a diner name. For instance, diner record 320 may be a record for user 140 of FIG. 1. The diner record 320 further includes a meal number, such as a sequential number that may also be used to identify an order in an ordering and fulfillment system, and a meal description "chicken w/mushrooms" (which again, may also be used to indicate an order of the user 140 in an ordering and fulfillment system). The diner record 320 may also include a device identifier (ID) and/or a table number of the diner. Thus, for example, server 116 may use the device ID to establish one or more communication sessions with device 110 of user 140. Alternatively, or in addition, server 116 may use the table ID to associate the user 140 with a tabletop or tableside display/computing device.

Referring again to FIG. 1, FIG. 2, and FIG. 3, server 116 may identify that the ingredient "chicken" appears in video 200 by detecting the associated code on a packaging, looking up the QR code in annotation data database 310 and retrieving the one of annotation data records 312 for "chicken." Server 116 may then extract one or multiple annotation content items for annotating video 200. For instance, server 116 may retrieve the source data available for "chicken" and may modify the video 200 to include a visual marker associated with the annotation content, where the visual marker may comprise the annotation content itself, or may comprise a barcode, QR code, or the like, and/or a hyperlink to access the annotation content. For example, as illustrated in FIG. 2, the video 200 may be modified to include a visual marker "organic chicken available at ABC Market" (e.g., this is an example where the visual marker is the annotation content itself). In one example, the visual marker may be included as an overlay on the video 200. In the present example, server 116 may also identify that the ingredient "mushrooms" appears in video 200 by detecting the associated QR code on the packaging, looking up the QR code in annotation data database 310 and retrieving the one of annotation data records 312 for "mushrooms." Server 116 may then extract one or multiple annotation data content items for annotating video 200. For instance, server 116 may retrieve the source data available for "mushrooms" and may modify the video 200 to include a visual marker associated therewith. For example, as illustrated in FIG. 2, the video 200 may be modified to include annotation content "mushrooms grown at XYZ Farms 7 miles away."

In addition, the visual marker may further comprise a selectable link "click to visit." For example, the source data for "mushrooms" may further include a URL or other links to a website for XYZ Farms. Server 116 may perform the same or similar process with regard to other QR codes detected in the video 200, and may further modify the video 200 accordingly. While the ingredients "salt" and "pepper" do not include source data, freshness data, or safety data, the video 200 may nevertheless be modified to at least indicate the names of the ingredients that have been identified in respective records in the annotation data records 312. In addition, server 116 may further modify the video 200 to include other visual markers, such as information regarding the chef (e.g., chef 192), which in one example may also comprise a link to access further information about chef 192 (such as a recorded greeting, the chef 192 speaking about his or her background or experience, a text biography, awards acquired by the chef, etc.).

The foregoing process may be performed by server 116 on an ongoing basis as the order of user 140 (e.g., "chicken and mushrooms") is prepared. Thus, for example, the visual markers added to video 200 may change as the ingredients visible on-screen change, as different tools are used, and so forth. In one example, where ingredients or tools persist on-screen for a duration of time, servers 116 may rotate different visual markers that is/are presented for respective items, or may change the appearance of visual markers. For instance, when an ingredient, such as "mushrooms," has multiple types of annotation data available in one of annotation data records 312, server 116 may alternate presenting source data and freshness data in the modifications to video 200. However, in another example, any or all available annotation data may be presented concurrently (e.g., to the extent there is space available on-screen, such as without obscuring a main part of the preparation area 181 from view in the video 200, without covering other items on-screen, etc.). In addition, as noted above, server 116 may stream the video 200, as modified, to the user 140, e.g., at device 110.

Device 110 may receive and present the modified video 200 on a display screen of the device 110. In one example, the modified video 200 may also include associated audio, e.g., from a microphone used by chef 192, which may also be presented by device 110 via an integrated speaker, an attached headset, or the like. As noted above, the modified video 200 may include a visual marker associated with the annotation content that may be viewed by the user 140 to provide useful and informative information as the dish is prepared by chef 192. In addition, in some cases, the visual marker may comprise the annotation content itself, or may comprise a visual code, such as a barcode or a quick response code, or a hyperlink to access the annotation content. Thus, the user 140 may select a link to visit a website of "XYZ Farms," such as by tapping on a portion of the display screen of device 110 with a button "click to visit" (e.g., where device 110 may comprise a smartphone or tablet computing device with a touchscreen, or the like), via a voice command, etc. In one example, the website may be accessed via a new window or overlay window, or may be accessed by server 116 on behalf of device 110 and further embedded in the modified video 200. Alternatively, or in addition, user 140 may select a link "meet the maker" to access additional annotation data about a maker of the cutting board, such as a biographical text, a video of the maker working in a shop, etc., may select a link "click to buy now" to access a website where the knife is available for purchase, and so on.

It should be noted that the foregoing is just one illustrative example of how examples of the present disclosure for modifying a video of a preparation area of a consumable item to generate a modified video that includes a visual marker associated with annotation content for at least one item in the video for presentation via a device associated with a user to be served the consumable item may operate. Thus, it should be noted that in other, further, and different examples, aspects described above with respect to server 116 may alternatively or additionally be provided by server (s) 114. For instance, instead of restaurant 190 maintaining a dedicated, on-premises restaurant management system, e.g., server 116, restaurant 190 may subscribe to a network-based and/or cloud-based restaurant management system, e.g., provided by server(s) 114. For instance, server(s) 114 may provide for inventory management, including ordering and supply chain management, may handle booking and reservations, payments and billing, staff scheduling, customer relationship management, and so forth, in addition to providing a consumable item video annotation service and integrating with diner profile management services and/or annotation data management services of server(s) 114. In other words, server(s) 114 may offer a comprehensive consumable item video annotation service and/or restaurant management system as a service to various user/diners and various restaurants.

In yet another example, user 140 need not utilize a personal device in connection with a meal with restaurant 190. For instance, restaurant 190 may provide table-top or tableside devices that may display video streams from the food preparation area(s) of restaurant 190 for diners and that may comprise touchscreens to enable accessing of additional annotation content in a same or similar manner as described above. In addition, although the foregoing is described and illustrated in connection with QR codes and other visual codes, in other, further, and different examples, items in video 200 may alternatively or additionally be identified via a wireless signal of a component of an item or a container of the item (e.g., an RFID tag). For instance, an RIFD reader may have a directional sensing zone that may coincide a field of view of camera 194 such that any RFID tag within the preparation area 181 may be sensed. Alternatively, or in addition, one or more of the items 182 may be identified in the video 200 via at least one visual object recognition model (e.g., a detection model for "chicken", a detection model for "mushrooms", etc.). In addition to the foregoing, various other features of the present disclosure may be provided via the system 100. For instance, in one example, server 116 of restaurant 190 (or server(s) 114, etc.), may obtain and modify video 200 with operational data of preparation area 181, such as an oven temperature, a grill flame setting, a stove flame setting, a fry oil temperature, etc. This will allow the capture of the kitchen conditions when the consumable item was prepared, e.g., the temperature of the pan when the chicken was cooked.

It should also be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102 and/or access networks 120 and 122 may comprise a content distribution network (CDN) having ingest servers, edge servers, and the like. Similarly, although only two access networks 120 and 122 are shown, in other examples, access networks 120 and/or 122 may each comprise a plurality of different access networks that may interface with network 102 independently or in a chained manner. For example, server 114 and server 116 may reach network 102 via different access networks, devices 110 and 112 may reach network 102 via different access networks, and so forth. Thus, these and other modifications are all contemplated within the scope of the present disclosure.

FIG. 4 illustrates a flowchart of an example method 400 for modifying a video of a preparation area of a consumable item to generate a modified video that includes a visual marker associated with annotation content for at least one item in the video for presentation via a device associated with a user to be served the consumable item, in accordance with the present disclosure. In one example, the method 400 is performed by a server of a restaurant, such as server 116 of FIG. 1, or any one or more components thereof, a server or servers of a consumable item video annotation system/service, such as server(s) 114 or AS 104 of FIG. 1, or any one or more components thereof, or by any one or more of such servers or devices in conjunction with one another and/or in conjunction with other devices and/or components of system 100 of FIG. 1. In one example, the steps, functions, or operations of method 400 may be performed by a computing device or processing system, such as computing system 500 and/or hardware processor element 502 as described in connection with FIG. 5 below. For instance, the computing system 500 may represent any one or more components of the system 100 that is/are configured to perform the steps, functions and/or operations of the method 400. Similarly, in one example, the steps, functions, or operations of the method 400 may be performed by a processing system comprising one or more computing devices collectively configured to perform various steps, functions, and/or operations of the method 400. For instance, multiple instances of the computing system 500 may collectively function as a processing system. For illustrative purposes, the method 400 is described in greater detail below in connection with an example performed by a processing system. The method 400 begins in step 405 and proceeds to step 410.

At step 410, the processing system captures a video of a preparation area for a consumable item. For instance, the consumable item may comprise a food or drink item. In one example, the processing system may comprise or may be in communication with a camera that is directed at the preparation area. In one alternative embodiment, associated audio may also be captured (e.g., sound of the cooking process and/or audio of the cooking staff preparing the item).

At step 420, the processing system identifies at least one item in the video, wherein the at least one item comprises at least one of: at least one ingredient of the consumable item, or at least one tool for preparing the consumable item. In one example, the at least one item may be identified in the video via a visual code on a container of the at least one item. For instance, the visual code may comprise a barcode, a QR code, or other visual code that is detectable and that uniquely identifies the at least one item. In another example, the at least one item may be identified in the video via a wireless signal of at least one component of the at least one item or a container of the at least one item. For instance, the at least one component may comprises an RFID tag. To illustrate, the at least one component may be detected via an RFID reader when the at least one item (e.g., including an RFID tag thereof) is within a field of view of a camera that is capturing the video. For instance, the RFID reader may include a directional antenna, or may have directional sensing capability. In one example, the processing system may comprise or may be in communication with either or both of the camera or the RFID reader. In still another example, the at least one item may alternatively or additionally be identified in the video via at least one visual object recognition model.

At step 430, the processing system identifies annotation content for the at least one item. For instance, when the at least one item comprises the at least one ingredient, the annotation content may comprise at least one of: information regarding a source of the at least one ingredient, freshness information of the at least one ingredient, or safety information associated with the at least one ingredient. Similarly, when the at least one item comprises the at least one tool, the annotation content may comprise at least one of: identifying information of the at least one tool, composition information of the at least one tool, purchasing information of the at least one tool, or a description of use of the at least on tool. In one example, step 430 may comprise performing a look-up of the visual code that may be detected at step 420, e.g., in an annotation data database, or the like, such as described above and illustrated in FIG. 3, to access an annotation data record of the at least one item.

At optional step 440, the processing system may obtain the annotation content for the at least one item. For instance, the processing system may extract annotation content from one or more fields of an annotation data record of the at least one item. Alternatively, or in addition, in the event that the annotation content is stored or accessible external to the processing system, in one example, the processing system may obtain the annotation content such as via a URL or other links contained in an annotation data record, or the like.

At optional step 450, the processing system may obtain operational data of the preparation area. For instance, the operational data may comprise at least one setting of at least one of: the at least one tool, or a different tool that is used for the preparing of the consumable item (e.g., oven temperature, flame setting for a grill or stove, fry oil temperature, etc.). In one example, the operational data may comprise environmental data such as temperature and humidity in the preparation area, and so on.

At optional step 460, the processing system may identify at least one person preparing the consumable item. For instance, the at least one person may comprise a chef or other preparer who may be identified by indicating a user ID to be associated with the camera directed at the preparation area, via tracking a location of the person being in the preparation area via a RFID tag on the person, e.g., a staff badge, or the like, via voice or facial recognition, etc.

At step 470, the processing system modifies the video to generate a modified video that includes a visual marker associated with the annotation content. For instance, the modified video may be the same or similar to the modified video 200 illustrated in FIG. 2. As discussed above, the visual marker associated with the annotation content may comprise the annotation content itself or a visual code comprising a barcode or a quick response code. In one example, the modified video may comprise an interactive video, where the visual marker may comprise a link to the annotation content. In addition, step 470 may further comprise modifying the video to include operational data or a link to operational data obtained at optional step 450. Similarly, step 470 may further comprise modifying the video to include biographical data of the at least one person or a link to the biographical data that may be obtained at optional step 460.

At step 480, the processing system presents the modified video via a device associated with a user to be served the consumable item. The device associated with the user may comprise a mobile computing device of the user. Alternatively, the device associated with the user may comprise a tabletop computing device deployed at a table associated with the user, or a tableside computing device deployed near the table associated with the user (e.g., within viewing distance, closer to the table than to any other tables, etc.). For instance, a tabletop or tableside computing device may be provided by a restaurant that is preparing the consumable item.

At optional step 490, the processing system may provide the annotation content in response to a user selection of a link associated with the visual marker (e.g., the visual marker may comprise a URL or other selectable link). In one example, optional step 490 may comprise accessing the annotation content, e.g., from a local database, a remote database, or from storage or memory of the processing system. In another example, the annotation content may be previously obtained at optional step 440. As noted above, the modified video may comprise an interactive video, where the visual marker may comprise a link to the annotation content. As such, the link may be selected by the user such as by tapping on a portion of a display screen of the device having a visual marker comprising a selectable link (e.g., a button "click to visit," "click to buy," etc.), via a voice command, etc. As also noted above, in one example, the visual marker may comprise a visual code such as a barcode or a quick response code. For instance, the modified video can be displayed on a tabletop or table side display, and the user can use a personal mobile device to scan such a QR code or other visual code. Alternatively, when displayed on the user's personal device, the user can use a QR reader app or the like to select portion of the modified video having a QR code of interest. The QR code may cause the personal mobile device to link to the processing system to perform additional retrieval and transmission of the associated annotation content to the user, either at the user's personal mobile device or via a tabletop or table side display. In other words, in one example, optional step 490 may include displaying the annotation content, where the processing system comprises the device associated with the user (e.g., a restaurant may operate the camera, generate the video, modify the video, and present the modified video via tabletop displays which are provided for guest use during meals).

Following step 480 or optional step 490, the method 400 proceeds to step 495. At step 495 the method 400 ends.

It should be noted that the method 400 may be expanded to include additional steps, or may be modified to replace steps with different steps, to combine steps, to omit steps, to perform steps in a different order, and so forth. For instance, in one example the processing system may repeat one or more steps of the method 400, such as steps 410-480, 410-490, etc. on an ongoing basis as the consumable item continues to be prepared, and as different items may come into view or be removed from the view, etc. In one example, steps 410-480, 410-490, etc., may be repeated for different meals of the same user, for different users, and so on. In one example, the method 400 may be expanded to include identifying the device associated with the user, e.g., determining a personal device associated with the user and/or establishing a communication session therewith, or associating the user with a particular tabletop or tableside display. In one example, the method 400 may be modified to include obtaining an order of the consumable item from the user, identifying the camera associated with the preparation area, and/or determining when the preparation of the consumable item for the user is to begin, and so forth. In one example, step 430 and/or optional step 440 may be performed in response to obtaining the order of the consumable item from the user, or in response to detecting the beginning of preparation of the consumable item. For instance, even if ingredients have not yet appeared on screen, the processing system may access an ingredient list of the consumable item and may then know to expect that various items (e.g., ingredients) should appear in the video. In other words, the processing system may pre-fetch at least a portion of the relevant annotation data records and/or the annotation content associated therewith.

In one example, the method 400 may be expanded to include time stamping the modified video to record the appearances of items therein, and recording/storing the time-stamped modified video. In one example, the method 400 may be expanded to including establishing a two-way interaction with a preparer of the consumable item (e.g., a two-way audio chat between the user and a chef). In one example, the method 400 may include the processing system obtaining the order from the device associated with the user, and correlating the user/user device with the consumable item to be prepared. For instance, a restaurant kitchen can indicate what is being prepared and the processing system may associate a current video feed with the particular user. In other words, other users do not necessarily have the ability to watch and/or interact for other's meal preparations, but they have exclusive access for their own. In still another example, the method 400 may include the processing system enabling an entire table of users (e.g., diners/guests) to be able to view preparation of all consumable items for that table. In one example, this may further include generating different modified videos, where annotations may be personalized to different users according to diner profiles of the respective users/diners (e.g., if a diner profile of a first user at the table indicates a preference for shopping, the processing system can generate a first modified video with more shopping links; however, if another diner profile of a second user at the table indicates a propensity for being learning oriented, the processing system may use more links to educational information about ingredients, tools, etc. (to the extent such type(s) of annotation content is available)). In still another example, the processing system may select annotation content collectively for the table, e.g., selecting annotation content that is anticipated to have the most appeal to the most diners at the table. Furthermore, the method 400 may be modified to include or additionally or alternatively comprise any additional components or functions described herein. More broadly, this solution may be applied to products other than meals that also are comprised of parts or ingredients that are combined or assembled to make the product. Thus, these and other modifications are all contemplated within the scope of the present disclosure.

In addition, although not expressly specified above, one or more steps of the method 400 may include a storing, displaying and/or outputting step as required for a particular application. In other words, any data, records, fields, and/or intermediate results discussed in the respective methods can be stored, displayed and/or outputted to another device as required for a particular application. Furthermore, operations, steps, or blocks in FIG. 4 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 5 depicts a high-level block diagram of a computing system 500 (e.g., a computing device or processing system) specifically programmed to perform the functions described herein. For example, any one or more components or devices illustrated in FIG. 1, or described in connection with FIGS. 2-4, may be implemented as the computing system 500. As depicted in FIG. 5, the computing system 500 comprises a hardware processor element 502 (e.g., comprising one or more hardware processors, which may include one or more microprocessor(s), one or more central processing units (CPUs), and/or the like, where the hardware processor element 502 may also represent one example of a "processing system" as referred to herein), a memory 504, (e.g., random access memory (RAM), read only memory (ROM), a disk drive, an optical drive, a magnetic drive, and/or a Universal Serial Bus (USB) drive), a module 505 for modifying a video of a preparation area of a consumable item to generate a modified video that includes a visual marker associated with annotation content for at least one item in the video, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 502 is shown, the computing system 500 may employ a plurality of hardware processor elements. Furthermore, although only one computing device is shown in FIG. 5, if the method(s) as discussed above is implemented in a distributed or parallel manner for a particular illustrative example, e.g., the steps of the above method(s) or the entire method(s) are implemented across multiple or parallel computing devices, then the computing system 500 of FIG. 5 may represent each of those multiple or parallel computing devices. Furthermore, one or more hardware processor elements (e.g., hardware processor element 502) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 502 can also be configured or programmed to cause other devices to perform one or more operations as discussed above. In other words, the hardware processor element 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 505 for modifying a video of a preparation area of a consumable item to generate a modified video that includes a visual marker associated with annotation content for at least one item in the video (e.g., a software program comprising computer-executable instructions) can be loaded into memory 504 and executed by hardware processor element 502 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 502) executing the computer-readable instructions relating to the above described method(s) can be perceived as a programmed processor or a specialized processor. As such, the present module 505 for modifying a video of a preparation area of a consumable item to generate a modified video that includes a visual marker associated with annotation content for at least one item in the video (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. An apparatus comprising: a processing system including at least one processor; and a non-transitory computer-readable medium storing instructions that, when executed by the processing system, cause the processing system to perform operations, the operations comprising: capturing a video of a preparation area for a consumable item; identifying at least one item in the video, wherein the at least one item comprises at least one of: at least one ingredient of the consumable item, or at least one tool for preparing the consumable item, wherein the at least one item is detected within a field of view of a camera that is capturing the video via at least one visual object recognition model, and wherein the at least one item is further identified in the video via a wireless signal of at least one component of: the at least one item or a container of the at least one item, wherein the at least one component comprises a radio frequency identification tag, and wherein the at least one component is detected via a radio frequency identification reader; identifying annotation content for the at least one item; modifying the video to generate a modified video that includes a visual marker associated with the annotation content, wherein the modified video comprises an interactive video, and wherein the visual marker comprises a link to the annotation content; presenting the modified video via a device associated with a user to be served the consumable item; and providing the annotation content in response to a selection of the link via the device associated with the user.

2. The apparatus of claim 1, wherein the device associated with the user comprises:
   a mobile computing device of the user;
   a tabletop computing device deployed at a table associated with the user; or
   a table-side computing device deployed near the table associated with the user.

3. The apparatus of claim 1, wherein the at least one item is identified in the video via a visual code on: the at least one item or a container of the at least one item.

4. The apparatus of claim 3, wherein the visual code comprises a barcode or a quick response code.

5. The apparatus of claim 1, wherein the apparatus further comprises:
   the camera; and
   the radio frequency identification reader.

6. The apparatus of claim 1, wherein the at least one item is identified in the video via the at least one visual object recognition model.

7. The apparatus of claim 1, wherein the at least one item comprises the at least one ingredient, wherein the annotation content comprises at least one of:
   information regarding a source of the at least one ingredient;
   freshness information of the at least one ingredient; or
   safety information associated with the at least one ingredient.

8. The apparatus of claim 1, the at least one item comprises the at least one tool, wherein the annotation content comprises at least one of:
   identifying information of the at least one tool;
   composition information of the at least one tool;
   purchasing information of the at least one tool; or
   a description of use of the at least one tool.

9. The apparatus of claim 1, wherein the visual marker associated with the annotation content comprises:
   the annotation content; or
   a visual code comprising a barcode or a quick response code.

10. The apparatus of claim 1, wherein the operations further comprise:
   obtaining the annotation content for the at least one item.

11. The apparatus of claim 1, wherein the operations further comprise:

obtaining operational data of the preparation area, wherein the operational data or a link to the operational data is presented in the modified video.

12. The apparatus of claim 11, wherein the operational data comprises at least one setting of at least one of: the at least one tool, or a different tool that is used for the preparing of the consumable item.

13. The apparatus of claim 1, wherein the operations further comprise:
identifying at least one person preparing the consumable item, wherein biographical data of the at least one person or a link to the biographical data is presented in the modified video.

14. A non-transitory computer-readable medium storing instructions that, when executed by a processing system including at least one processor, cause the processing system to perform operations, the operations comprising:
capturing a video of a preparation area for a consumable item;
identifying at least one item in the video, wherein the at least one item comprises at least one of: at least one ingredient of the consumable item, or at least one tool for preparing the consumable item, wherein the at least one item is detected within a field of view of a camera that is capturing the video via at least one visual object recognition model, and wherein the at least one item is further identified in the video via a wireless signal of at least one component of: the at least one item or a container of the at least one item, wherein the at least one component comprises a radio frequency identification tag, and wherein the at least one component is detected via a radio frequency identification reader;
identifying annotation content for the at least one item;
modifying the video to generate a modified video that includes a visual marker associated with the annotation content, wherein the modified video comprises an interactive video, and wherein the visual marker comprises a link to the annotation content;
presenting the modified video via a device associated with a user to be served the consumable item; and
providing the annotation content in response to a selection of the link via the device associated with the user.

15. A method comprising:
capturing, by a processing system including at least one processor, a video of a preparation area for a consumable item;
identifying, by the processing system, at least one item in the video, wherein the at least one item comprises at least one of: at least one ingredient of the consumable item, or at least one tool for preparing the consumable item, wherein the at least one item is detected within a field of view of a camera that is capturing the video via at least one visual object recognition model, and wherein the at least one item is further identified in the video via a wireless signal of at least one component of: the at least one item or a container of the at least one item, wherein the at least one component comprises a radio frequency identification tag, and wherein the at least one component is detected via a radio frequency identification reader;
identifying, by the processing system, annotation content for the at least one item;
modifying, by the processing system, the video to generate a modified video that includes a visual marker associated with the annotation content, wherein the modified video comprises an interactive video, and wherein the visual marker comprises a link to the annotation content;
presenting, by the processing system, the modified video via a device associated with a user to be served the consumable item; and
providing, by the processing system, the annotation content in response to a selection of the link via the device associated with the user.

16. The method of claim 15, wherein the device associated with the user comprises:
a mobile computing device of the user;
a tabletop computing device deployed at a table associated with the user; or
a table-side computing device deployed near the table associated with the user.

17. The method of claim 15, wherein the at least one item is identified in the video via a visual code on a container of the at least one item.

18. The method of claim 17, wherein the visual code comprises a barcode or a quick response code.

19. The method of claim 15, wherein the at least one item is identified in the video via the at least one visual object recognition model.

20. The method of claim 15, wherein the at least one item comprises the at least one ingredient, wherein the annotation content comprises at least one of:
information regarding a source of the at least one ingredient;
freshness information of the at least one ingredient; or
safety information associated with the at least one ingredient.

* * * * *